(12) United States Patent
Kamille

(10) Patent No.: US 7,072,852 B1
(45) Date of Patent: Jul. 4, 2006

(54) METHOD OF SCORING A SELF-TARGETING COUPON

(75) Inventor: Stuart Kamille, 636 Jefferson Cir., Atlanta, GA (US) 30328

(73) Assignee: Stuart Kamille, Atlanta, GA (US)

( * ) Notice: Subject to any disclaimer, the term of this patent is extended or adjusted under 35 U.S.C. 154(b) by 0 days.

(21) Appl. No.: 09/461,698

(22) Filed: Dec. 14, 1999

(51) Int. Cl.
*G06F 17/60* (2006.01)

(52) U.S. Cl. ...................................... 705/14
(58) Field of Classification Search ............ 705/14
See application file for complete search history.

(56) References Cited

U.S. PATENT DOCUMENTS

| | | | | |
|---|---|---|---|---|
| 4,756,532 A | * | 7/1988 | Kamille | 273/153 R |
| 4,964,642 A | * | 10/1990 | Kamille | 273/240 |
| 5,025,139 A | * | 6/1991 | Halliburton, Jr. | 235/379 |
| 5,621,200 A | * | 4/1997 | Irwin et al. | 235/375 |
| 5,870,724 A | * | 2/1999 | Lawlor et al. | 705/42 |
| 5,996,997 A | * | 12/1999 | Kamille | 273/139 |

FOREIGN PATENT DOCUMENTS

| | | | |
|---|---|---|---|
| AU | 9863742 A | * | 7/1998 |
| WO | WO 95/30199 | * | 11/1995 |

OTHER PUBLICATIONS

Merriam Webster Collegiate Dictionary, definition of score downloaded from http://www.search.eb.com/dictionary on Jun. 17, 2002.*
Fields, Laura, "Making coupons count", Marketing, Jul. 10, 1997, pp. 27-29.*
Sale, Richard, "Evaluation in Evolution", Promo, Sep. 1998.*

* cited by examiner

*Primary Examiner*—Donald L. Champagne
(74) *Attorney, Agent, or Firm*—Blakely, Sokoloff, Taylor & Zafman LLP

(57) ABSTRACT

A self-targeting coupon having fields covered with removable material. A first field has at least one multiple choice question having answers printed, marked or indicated on top of the removable material. The removable material covers information indicating an area of a second field to select. Selection of the indicated area of the second field determines the value of the coupon. In a preferred embodiment, answers to several multiple choice questions in the first field together indicate an area of the second field to select. Thus, several possible values can be contained on each coupon with the choice of the individual determining the final value. This technique can also be applied to paper tests and video tests, as well as programmed learning. In testing situations, selection of answers by a student in one field may indicate an area of a next field to select such that the score of the test is revealed simultaneously with the end of the test. In a programmed learning situation, selection of responses by the student will direct the information that is revealed next so that learning is increased and the time required is reduced.

7 Claims, 13 Drawing Sheets

Score Field

310

What is the capital of the United States?
A. New York
B. San Francisco
Row 3 or 4 — 351c
D. Chicago Who is buried in Grant's tomb?
A. Lincoln
B. Washington
C. Jefferson
Even row — 352d What is the capital of the United states?
A. New York
Column 3 or 4 — 353b
C. San Francisco
D. Chicago Who is buried in Grant's tomb?
A. Lincoln
B. Washington
C. Jefferson
Even column — 354d Question Field

FIG. 3c

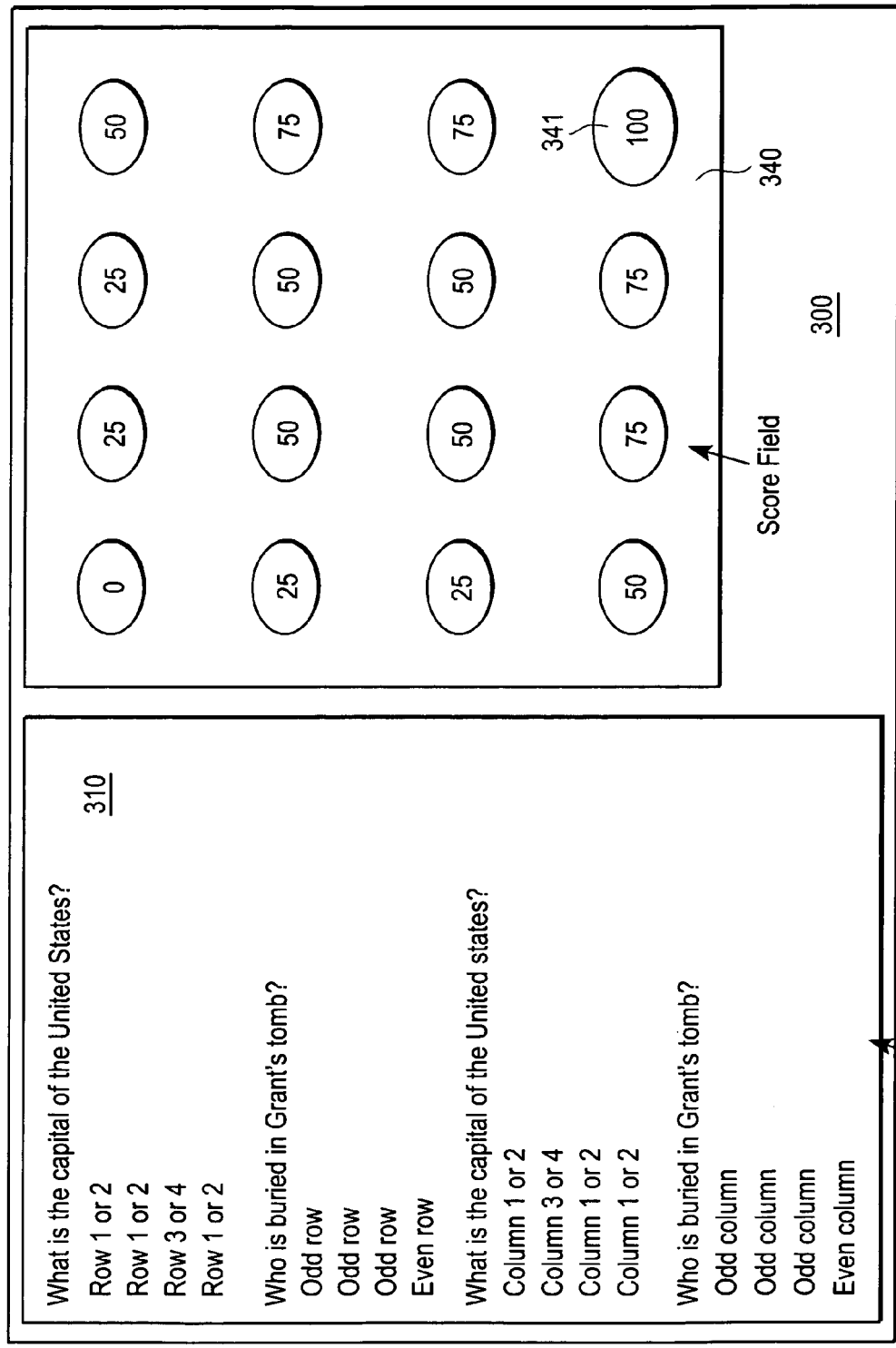

FIG. 4b

410 — Who is buried in Grant's tomb?
A. Lincoln
B. Washington
C. Jefferson
D. Grant
411

450 — What is the capital of the United States?
A. Choose 3
B. San Francisco
C. Choose 4
D. Chicago What is the capital of France?
A. Choose 5
B. Choose 6
C. Brussels
D. Montreal

460

3
A. Choose 7 (wrong)
B. Choose 8 (wrong)
C. Choose 4 (right)
D. Choose 5 (right)

4
B. Choose 8 (wrong)
D. Choose 5 (right)

5
A. Choose 6 (right)
C. Choose 9 (wrong)

6
B. Choose 11 (right)
D. Choose 10 (wrong)

470

7
A. (Right) 10
C. (Wrong) 0

8
A. (Wrong) 20
B.
C.
D. (Right) 30

9
A.
C. (Right) 60
D. (Wrong) 50

10
C. (Right) 80
D. (Wrong) 70

11
C. (Right) 100
D. (Wrong) 90

400

Score

US 7,072,852 B1

METHOD OF SCORING A SELF-TARGETING COUPON

FIELD OF THE INVENTION

The present invention relates to scoring and evaluation of elicited responses; more particularly, the present invention relates to simultaneous scoring and evaluation of elicited responses. Such scoring and evaluation may used in areas such as, for example, targeting coupons, test scoring, and programmed learning.

BACKGROUND OF THE INVENTION

Merchandising systems and, more particularly, coupon discounts are used to promote sales of particular products. Discount coupons have long been used to attract individuals to certain products in order to encourage sampling or trial or to increase volume. Such coupons are frequently distributed in newspapers, through the mail, or inside or attached to packages of products. These methods serve to distribute the coupon, but do a very poor job in directing the coupon to the proper user.

Users have distinct opinions, tastes, likes and dislikes that vary throughout the population. Therefore, a general method of distribution to the entire population provides a large number of coupons to disinterested users. It is not surprising that there is a very large amount of waste, particularly where it is common to find that well over 95% of all coupons are unused. This low redemption rate is very costly to the manufacturer or sponsor of the coupon.

To enhance redemption of their coupons, sponsors have spent heavily in market research to determine the characteristics of their ideal user, to try to find pools of these users, and to distribute their coupons to them. Such micro marketing greatly increases the redemption rate, but at the sacrifice of large numbers of potentially interested users who, for whatever reason, are not included in the target pool.

What is needed is a method of targeting coupons that achieves greater efficiency and wider participation by a broader audience in the offers of the sponsor while reducing the waste of non-redeemed coupons occurring in the prior art.

In the field of testing and test analysis and scoring, traditional methods of marking test papers by students and grading of test papers by teachers has remained unchanged for years. While computer aided analysis of test questions has greatly improved the amount of time instructors spend grading papers, there is no method of applying computer analysis to paper and pencil tests without first running the test, then collecting the papers, and then processing the papers.

Certain new methods of programmed learning, whereby information is imparted to students depending on the students response, have achieved only limited popularity. Some such methods are time consuming to construct, since each response must be elaborately worked into booklet form with involved branching to various sections of the booklet depending upon the answers given by the student. Thus, while programmed learning has the advantage of intense learning geared to the student's responsiveness and ability, the amount of time required to prepare the possible responses makes its use very expensive and time consuming.

With the advent of electronic documents and enhanced bandwidth, people may now express their desires and opinions via computer assisted mechanisms such as the world wide web. Currently such responses are made by using so called drop down menus which present a list of possible responses or by filling in blank areas on the screen as if typing upon the page. However, drop down menus presenting a list of possible responses are not context sensitive and the need to type introduces error. Thus, the information gathered lacks precision.

SUMMARY OF THE INVENTION

A self-targeted coupon is described. In one embodiment, the self-targeted coupon has a first field and one or more additional fields. The first field has at least one question and a response area which has at least one response on removable concealer. Selection of one of the one or more responses by a user in response to the one or more questions reveals information referring to the one or more fields.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 3a, 3b, 3c and 3d illustrate a first embodiment of a self-scoring test.

FIGS. 4a and 4b illustrate a second embodiment of a self-scoring test.

DETAILED DESCRIPTION

A multi-valued coupon with self-targeting capabilities is disclosed. In the following description, numerous specific details are set forth such as configurations, materials, media, etc., in order to provide a thorough understanding of the present invention. It will be apparent, however, to one skilled in the art that these specific details need not be employed to practice the present invention. In other instances, well known materials or methods have not been described in detail in order to avoid obscuring the present invention.

Figure 1B:
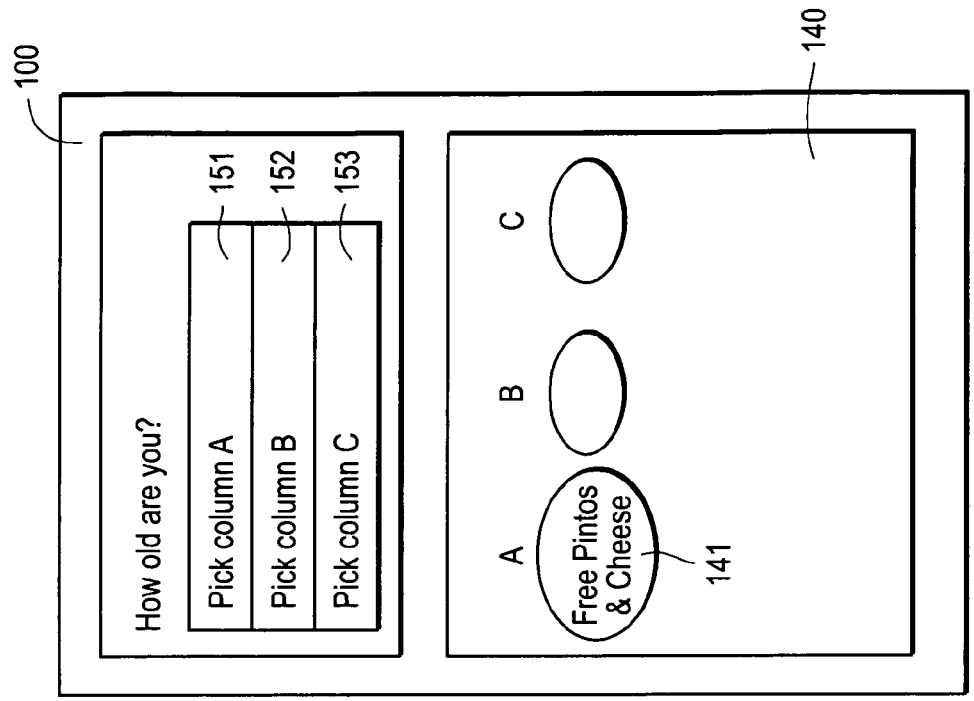
FIGS. 1a and 1b illustrate a first embodiment of a self-targeting coupon.
Figure 1A:
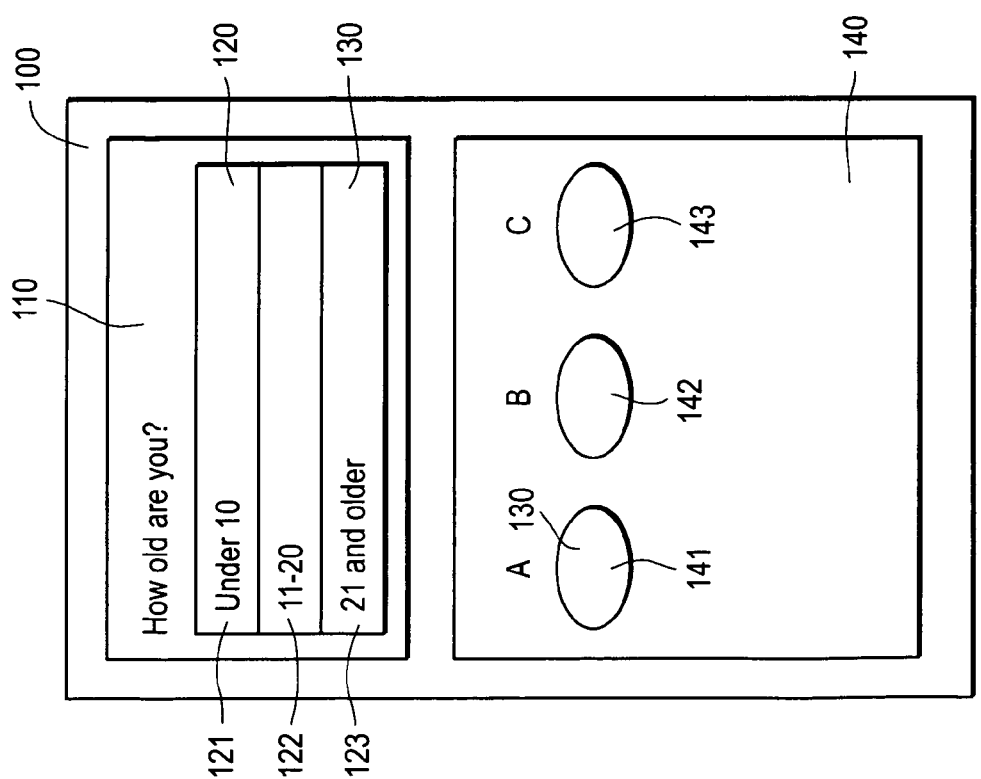

FIGS. 1a and 1b illustrate one embodiment of a multi-valued coupon with self-targeting capabilities. Referring to FIG. 1a, coupon 100 comprises a first field 110 and a second field 140. In one embodiment, the first field includes a question and a response area 120 including three responses 121–123. Each of the responses is on top of a removable concealer 130. In one embodiment, the removable concealer may comprise a concealer such as, for example, latex or other type of removable material. In video embodiments of the coupon, the removable concealer may include any mechanism by which the user is prevented from seeing the information under the responses. The responses may be printed, marked or otherwise set forth on top of the removable concealer.

Based on an individual's answer to the question, the individual selects one of the responses. For example, in response to the question, "How old are you?", an individual may select response 121 if under 10 years old, select response 122 if between the ages of 11 and 20, or may select response 123 if 21 years of age or older.

In an alternate embodiment, the first field 110 may provide indicia other than a question, which when viewed by an individual directs the individual to select one of the responses. In one embodiment, a response is selected by rubbing off or otherwise removing the removable concealer 130 from the selected response area. In video embodiments, a cursor controlled, touchscreen, or other type of selection may be made.

Thus, the removable concealer 130 acts as a concealer to the response underneath the removable concealer 130. When the removable concealer 130 is removed, information is revealed referring to the second field 140. In one embodiment, the answer to the question is directly linked to a particular portion or area of the second field.

FIG. 1*b* shows the coupon of FIG. 1*a* with the responses and removable concealer 130 removed from response area 120, revealing directions indicating which area of the second field 140 to select. In other embodiments, removal of the removable concealer 130 from response area 120 may reveal a color, a font, a shape, an art work or a characteristic that would refer the individual to an area of another field.

In the embodiment shown, the second field 140 is the value area which contains a variety of coupon values. One of the areas within the second field 140 are selected by the user as the final step in the targeting process. In alternative embodiments, more than one area may be selected. In one embodiment, the selection by the individual includes removing removable concealer from one or more areas in the second field 140. For example, if a user responds that he is under 10, the directions under that response indicates that he should choose selection A 141 of the second field 140. Removing the concealer from selection A 141 reveals a coupon entitling him to "free pintos and cheese." In other embodiments, revelation of information to an individual by choosing a response in response area 120 may include not revealing a value, a direction or a symbol to the individual. Thus, an individual would not select an area of another field.

Thus, FIGS. 1*a* and 1*b* illustrate one embodiment of a coupon used to target three different categories of people based on age. The same type of coupon can be used for the entire population with the value of the coupon directed to the tastes and interests of an individual user. Instead of age, the selection criteria may be, for example, other physical attributes, such as height, hair color, other physical characteristics, or mental characteristics. The selection criteria may also be more universal criteria such as national origin, race, etc. Thus, there is no need for separate coupons with different values to be generated and targeted to different audiences, and only a single coupon is needed to target multiple audiences.

Although the coupon of FIGS. 1*a* and 1*b* and other embodiments of coupons and tests are described herein as having removable concealer that is rubbed off, the coupon does not necessarily have to have removable concealer. In fact, if the coupon is used or viewed from a video terminal (operating under the control of a processing device), the removable concealer may be some other form of removable concealer that prevents a user from viewing an area and that may be removed to reveal or provide viewing to a particular field. In such a case, in one embodiment, after the viewer has viewed the coupon value, a printer (acting under control of a processing device and the viewer's interaction with the video via touchscreen and/or input buttons/control) prints an individual coupon for the viewer. Note that the remainder of the scoring and evaluation methods described herein may be implemented using video (as part of a system, a network, kiosk, etc.).

Figure 2A:
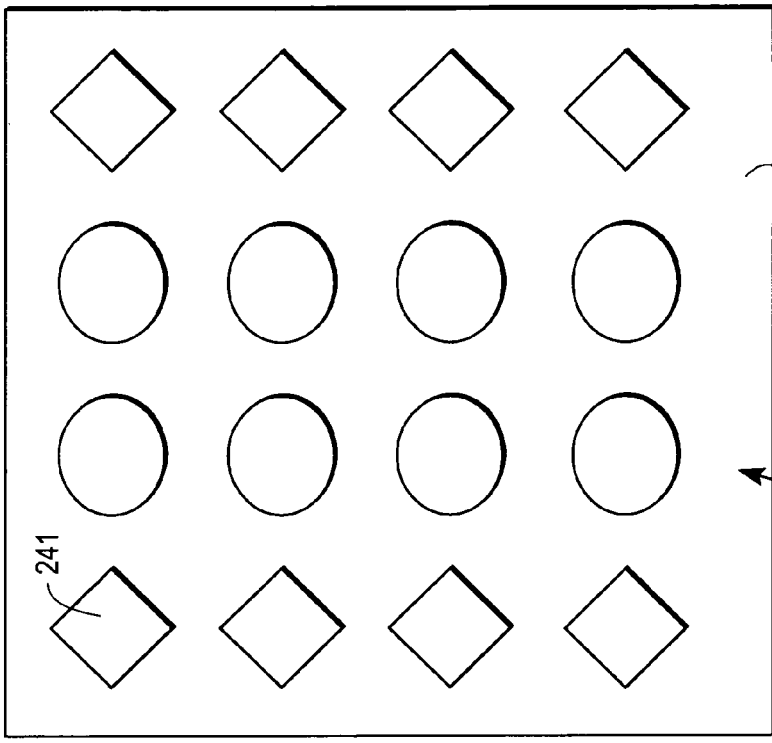
FIGS. 2a and 2b illustrate a second embodiment of a self-targeting coupon.
Figure 2B:
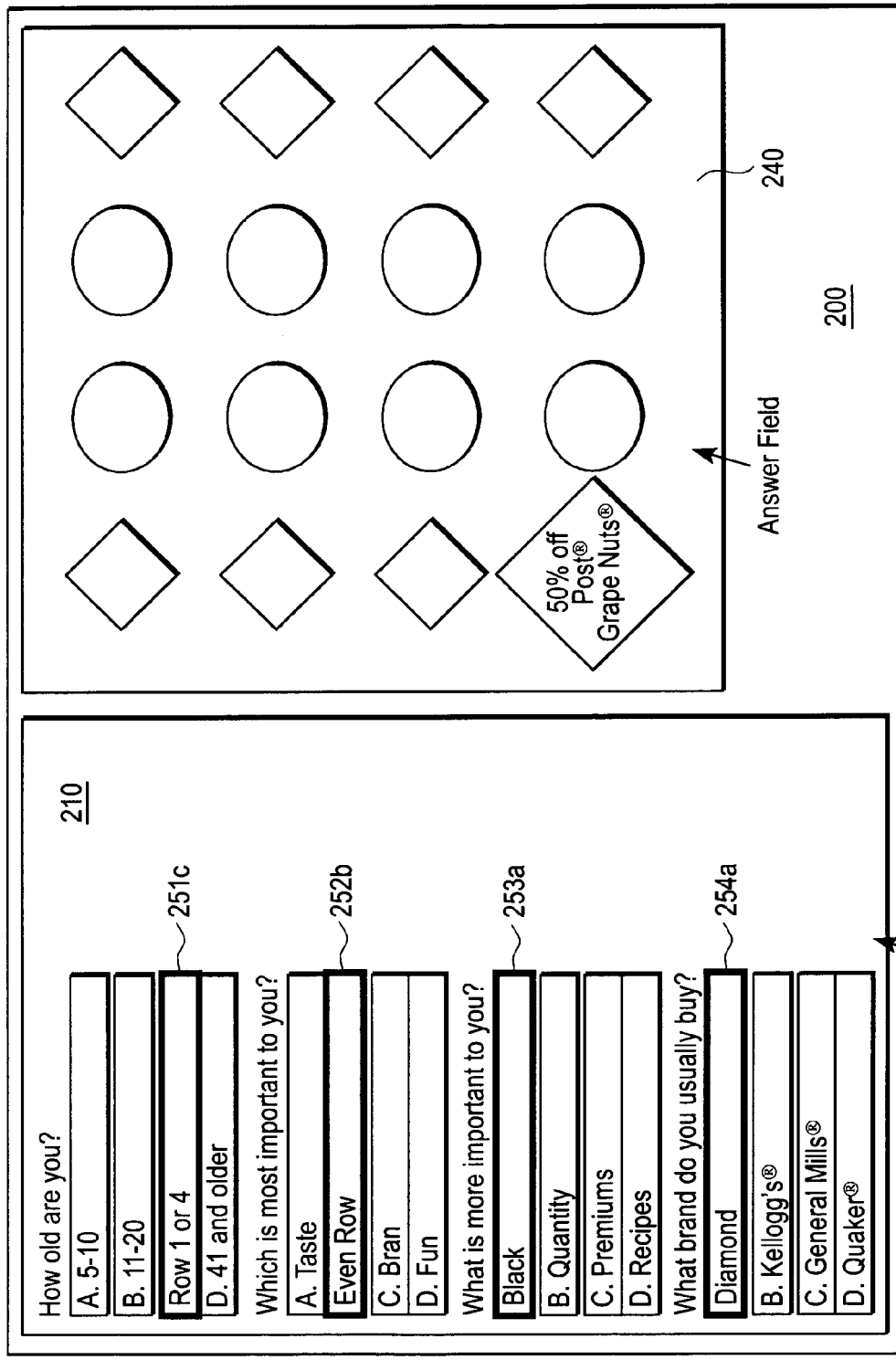

FIGS. 2*a* and 2*b* illustrate a second embodiment of a self-targeting coupon. Referring to FIG. 2*a*, a first field 210 of coupon 200 includes a series of questions 211–214. Each question has a response area with four separate responses (221*a–d*, 222*a–d*, 223*a–d*, 224*a–d*) from which a user can select. Each response is on top of a removable concealer 130, as described above, and covers information indicating an area of second field 240 to select. As shown in FIG. 2*b*, it is necessary to select answers to all four questions in order to determine which area of the second field to uncover. In the embodiment shown in the second field 240, there are sixteen possible combinations from which to select. Thus, there are sixteen different characterizations of the coupon. The sponsor or sponsors of the coupon can arrange the characterizations to match the responses in any manner they want or in the manner that will reach the target audience.

Again, as with the coupon of FIGS. 1*a* and 1*b*, a number of different outcomes is provided through user chosen responses. If the questions in the first field 210 seek an opinion of consumer preferences as shown in FIGS. 2*a* and 2*b*, the result could be a coupon for a particular product to provide an incentive to make a purchase. This would allow a sponsor to put several different offers upon a single coupon and allow an individual to choose through their responses the type of coupon they would most prefer. In other embodiments, revelation of information to an individual by choosing a response in response areas 221–224 may include not revealing a value, a direction or a symbol to the individual. Thus, an individual would not select an area of another field.

The second field 240 is laid out in a four by four grid with selection areas differentiated by two different shapes and two different colors. In the case of cereal coupons, the sixteen different responses could reveal coupon values that provide for an amount of money to be deducted off the purchase price, buy a certain quantity (e.g., one) and get a certain quantity (e.g., one) free, or receive a certain free item (e.g., recipe booklet, toy premiums, etc.). Multiple (e.g., two, three, four, etc.) different brands or types could be featured all on the same coupon. Additional demographic information and consumer choice data can be collected as well. Such a coupon can provide not only self-targeted user selection, but also allow great economies by pooling budgets from four different brands and printing all the coupons with one design and one delivery method while preserving each brand's identity and reaching that brand's target user. This allows for a highly accurate "targeting" of the user to the coupon.

When coupons are delivered in a prescreened manner, there is a much greater likelihood of their use. As described herein, the screening is done by user responses to questions on the coupon. The result may be a high redemption rate, far less wasted paper, and a reduction in printing and distribution costs.

In FIG. 2*b*, the information 251*c* related to question 211 directs the user to two possible rows (or 8 possible selections). That is, by removing the concealer from response choice 221c of FIG. 2a, the revealed response directs the user to rows 1 and 4. The information 252b related to question 212 (revealed by removing the concealer on response choice 222b of FIG. 2a) further narrows the selection to 4 possible choices by adding the limitation of a specific row (i.e., even row in this case). The information 253a to question 213 (revealed by removing the concealer on response choice 223a of FIG. 2a) directs the user to a specific color (i.e., black in this case), limiting the choices to two. Finally, the information 254a (revealed by removing the concealer on response choice 224a of FIG. 2a) related to question 214 limits the selection to a specific shape (i.e., diamond in this case), leaving only one choice. In other embodiments, removal of the removable concealer from the response area may reveal a color, a font, a shape, an art work, a form or a characteristic that would refer the individual to an area of another field.

Each of the selections in the second field 240 comprise information characterizing the coupon covered by a removable concealer 130. The information characterizing the coupon may be a value, such as, for example, "50¢ off," a direction, such as, for example, "buy one, get one free," a symbol with a key on the coupon indicating the value of the coupon, or any other indicia that may be used to convey a value or other information to a user. A symbol may be used to indicate a price savings, increased quantity, a premium, or a recipe pack or other item to be received with purchase.

In this manner, a particular value can be presented to a user in response to their choice. Thus, instead of having one value and varying only the target audience, as is traditional in the coupon industry, users are presented with a particular set of questions which will direct them to specific parts of the coupon reflective of their interest. In this case, the audience manipulates the value through questions so that their answers determine the type and value of the coupon.

Thus, the user ends up with a coupon which matches his taste and preference. Such a coupon has a much greater desirability and will in all likelihood be redeemed, thereby allowing far less waste, much greater efficiency, and wider participation by a broader audience in the offers of the sponsor.

Eliciting responses from users is equally applicable toward analysis of student knowledge in a testing situation in which students are tested and their answers evaluated for accuracy simultaneously, such as illustrated, for example, in FIGS. 3a–3d. This saves the instructor time since as the questions are answered, a score can be calculated. Thus, once the test is finished, the score, or result (grade), of the test is already calculated and revealed to the student.

Figure 3A:
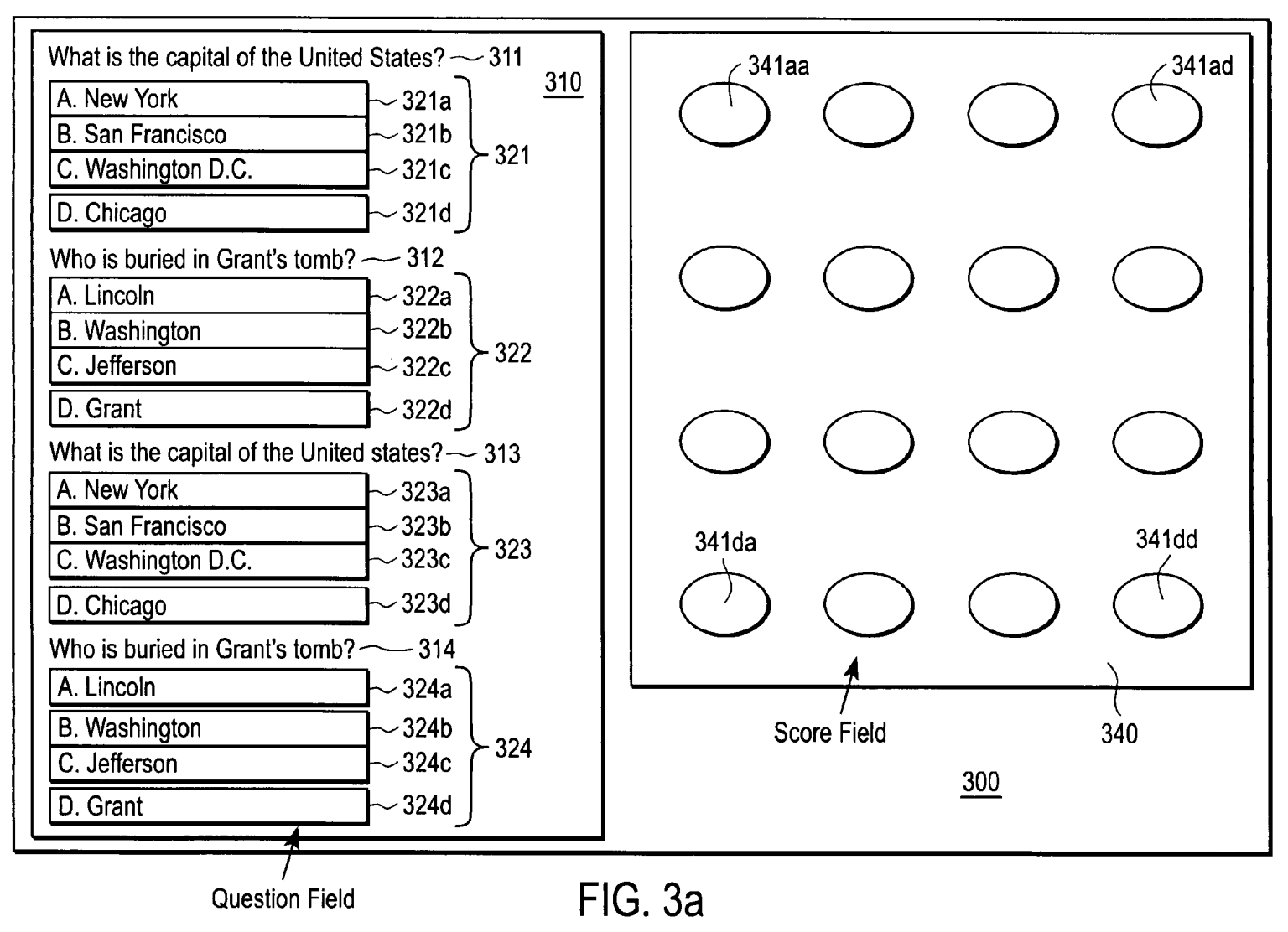

FIG. 3a shows one embodiment of a test having two fields, a question field 310 and a score field 340. The question field 310 has four questions 311–314, each having a response area 321–324 including four possible responses 321a–d, 322a–d, 323a–d, 324a–d. The responses are printed, marked or otherwise appear on top of a removable concealer, as described above with reference to the coupon. Further information is printed under the removable concealer, directing the student to an area of the score field 340 to uncover. Thus, the removable concealer 130 is used as an alternate way of marking. To indicate a selection, the student removes the removable concealer and thus, the selection is unchangeable. This provides additional security to the answer as well as eliminates any possible confusion over the student's choice since erasure marks and unintended marks are eliminated.

Further, this way of marking answers also eliminates the need for pens, pencils, or special marking devices yet still provides an automated method of answer accumulation and scoring.

Figure 3B:
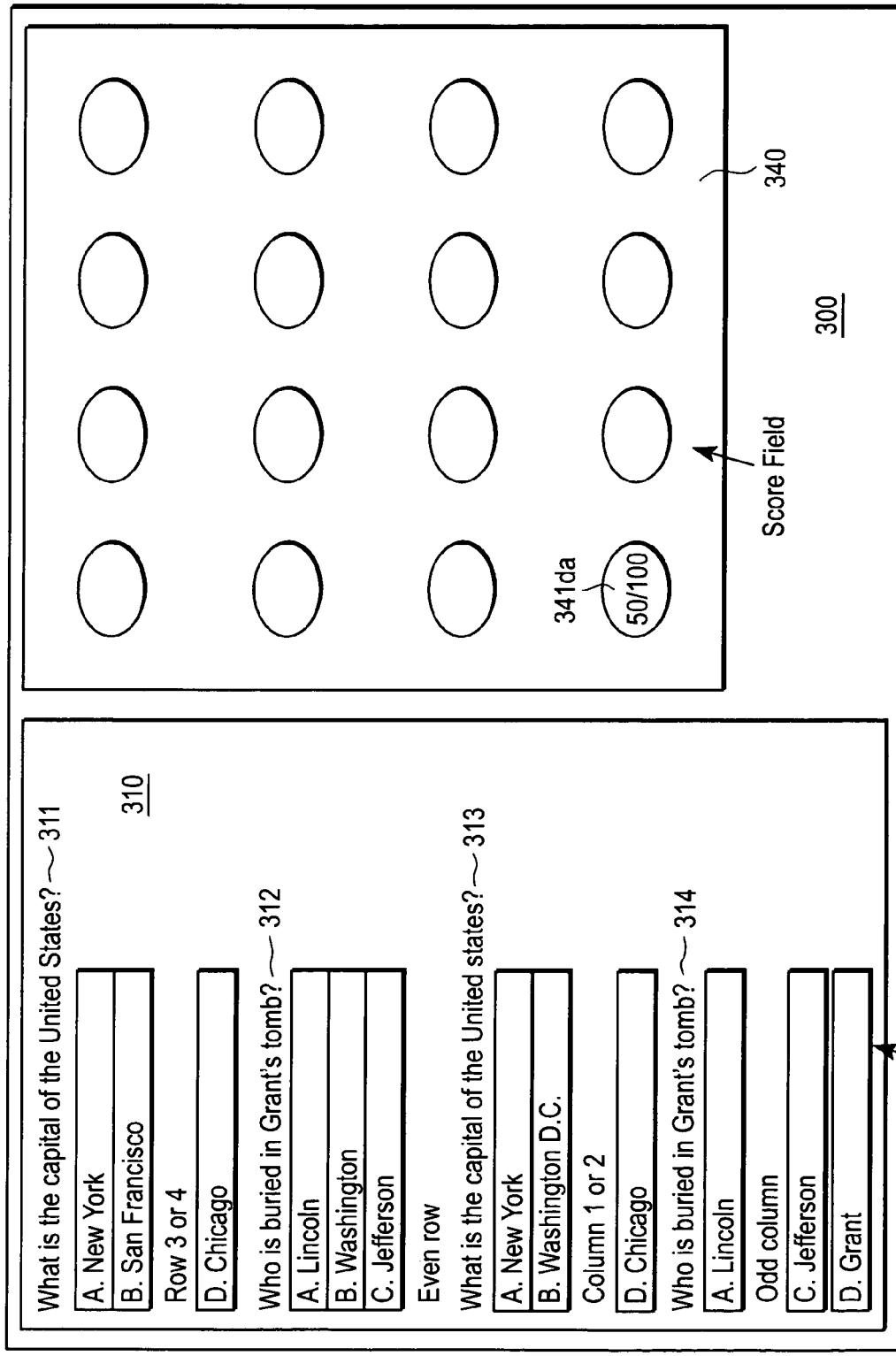

The score field 340 comprises a four by four grid of possible scores 341aa–341dd (where the first letter represents the row and the second letter represents the column) covered by a removable concealer. Each of the responses in the question field 310 directs the student to one of the possible scores depending on whether the student answered the question correctly or not, as seen in FIGS. 3b–3d. Referring to FIG. 3b, questions 311 and 312 are answered correctly, directing the student to either row 3 or 4 and an even row, respectively. The student is directed to pick one of the scores in row 4. Questions 313 and 314 are answered incorrectly, and thus, the student is directed to columns 1 or 2 and an odd column, respectively. Each question is given a value of 25 points for a total of 100 points. Thus, the student receives a score of 50 points out of a possible 100 for answering two of the four questions correctly.

Referring to FIG. 3c, all four questions 311–314 are answered correctly and the directions 351c, 352d, 353b and 354d under answers 321c, 322d, 323b and 324d, respectively, are revealed. Direction 351c directs the user to two possible rows (i.e., "Row 3 or 4" in this case), direction 352d narrows the row choice to one row (i.e., "Even row "in this case), direction 353b narrows the column choice to two possible columns (i.e., "Column 3 or 4" in this case), direction 354d narrows the row choice to one row (i.e., "Even row "in this case). Thus, the directions 351c, 352d, 353b and 354d under selected answers 321c, 322d, 323b and 324d direct the user to the answer in Row 4, Column 4 of the Score Field where removing the removable concealer over answer choice 341dd reveals a score of 100/100.

All the possible combinations are shown in FIG. 3d, where all of the answers and all of the scores are uncovered. Thus, it is shown that if a student gets only question 312 correct, he will be directed to row 2, column 1, where he can find his score of 25.

In other embodiments of self-scoring tests, the non-removal of removable concealer in a field may determine a score, or what score to assign for the test. In other embodiments, accumulating codes, on top of or under removable concealer, may be used to determine a score after the completion of a test or simultaneously with performance of the test (selection of answers).

Figure 4A:
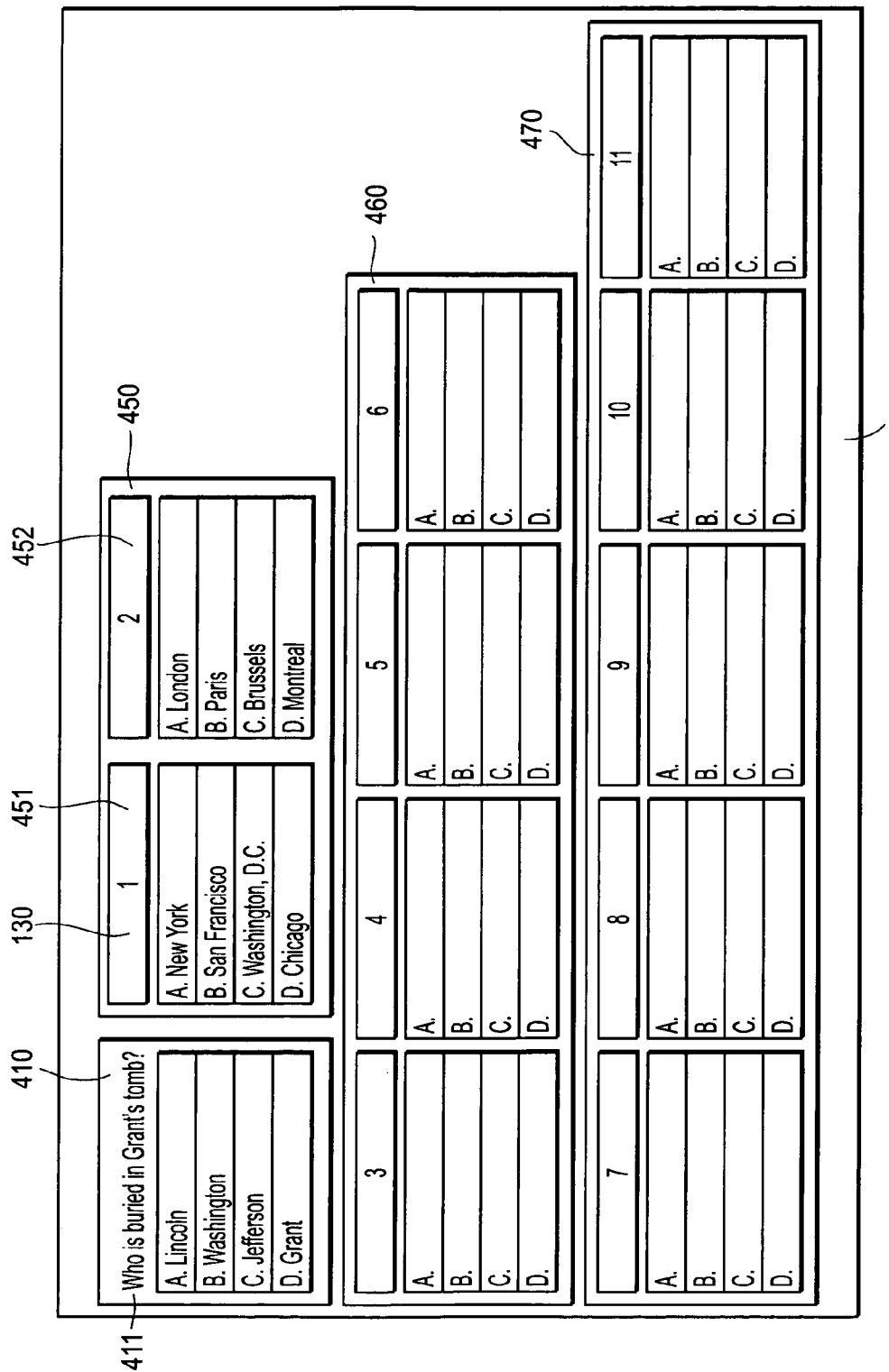

FIGS. 4a and 4b illustrate another embodiment of a test. Referring to FIG. 4b, the difficulty of the next question depends on whether the student gave a correct answer or not. FIG. 4a shows the test in the form it is to be given. The test in FIG. 4a has four fields 410, 450, 460, 470, each having questions and four possible answers for each question. Only the question in the first field 410 is revealed.

Each of the other fields 450–470 has questions covered by removable concealer 130 having the question number printed, marked or otherwise appearing upon the removable concealer. The answers for the questions in all four fields are printed, marked or otherwise appear upon removable concealer 130, which covers a direction, in the case of fields 410, 450 and 460, or a score, in the case of field 470.

An answer is selected in field 410 by removing (e.g., rubbing off) the removable concealer upon which the answer appears. This reveals a direction depending on whether the answer was correct, as shown in FIG. 4b. The direction in field 410 directs the student to question 2 in field 450 if the answer was incorrect and question 3 in field 450 if the answer was correct. The student receives further direction in field 450 depending on what question he selects and if he answers the question correctly. In this manner, a test can be directed toward more difficult questions if the student answers the previous questions correctly or easier questions if the student answers the previous questions incorrectly. Thus, different students can take different difficulty tests yet use the same test.

Further, as shown in FIG. 4b, field 460, if the student answers easier questions correctly, he may be directed back to the more difficult path and receive the same higher score as other students who answered the previous questions correctly and were in the more difficult question path. Thus, a student who answered the question in field 410 incorrectly may still receive a score of 100 if he answers questions 1, 4, 5, 6 and 11 correctly. A student who answered question 411 correctly needs only answer question 411 and questions 2, 6 and 11 correctly to receive the same score of 100. Test givers can vary the embodiment of the tests by varying the directions given for correct and incorrect answers. Thus, using these principles, the number of questions and the difficulty of the test can vary from student to student, yet one test will be given and the score will already be calculated at the end of the test.

Figure 5:
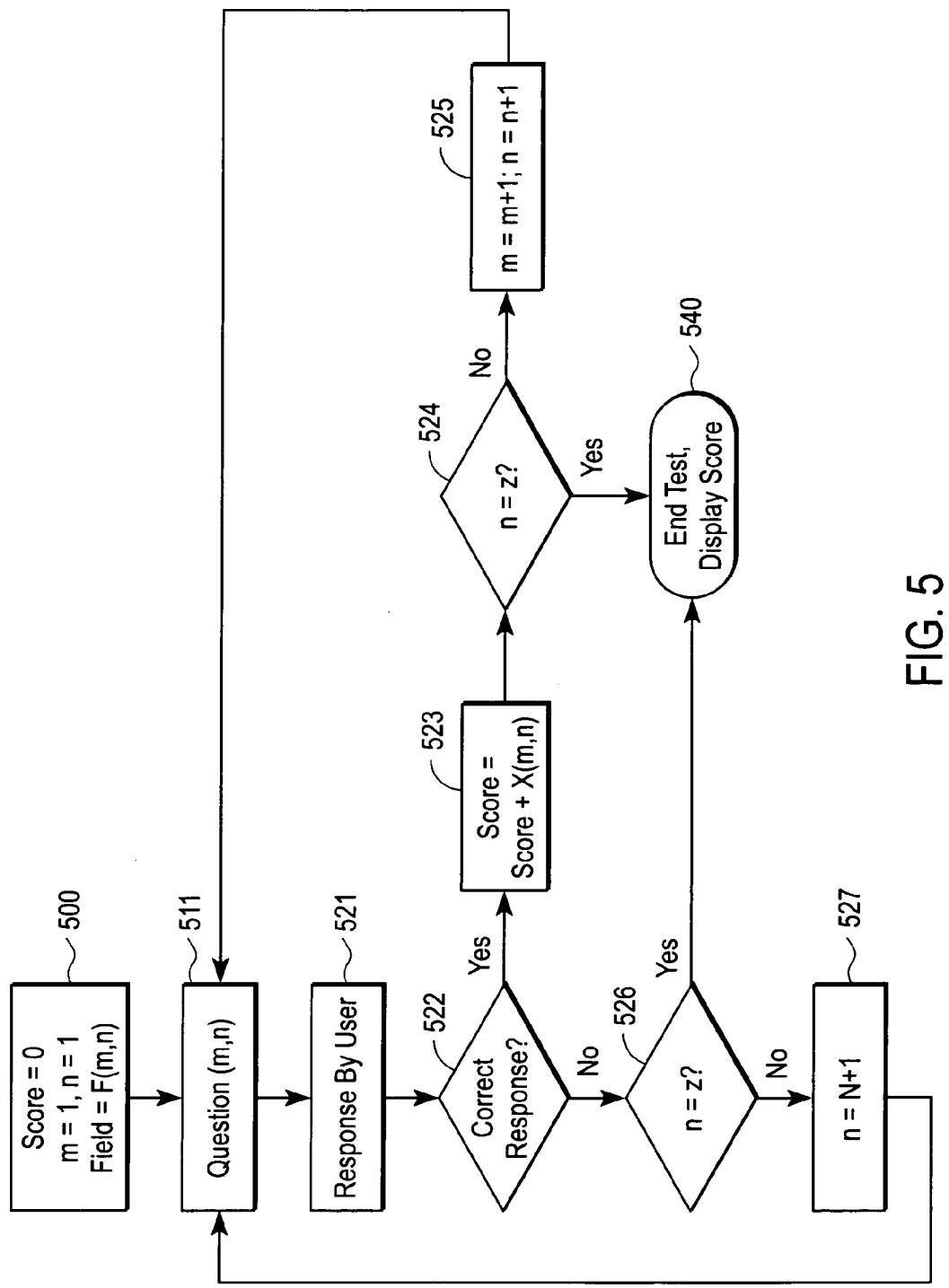
FIG. 5 illustrates one embodiment of a self-scoring computer test.

These same principles can be used in video testing situations where students are presented with a series of questions on a computer screen or other appropriate media. As illustrated in FIG. 5, the selection of the next question depends on the student's response. FIG. 5 shows an embodiment of a computer test processing. Although the term computer test is used, the following description is not limited to computer tests and may be applicable to other applications of the scoring and evaluation techniques described herein. The process is performed by processing logic which may comprises hardware, software, or a combination of both.

Referring to FIG. 5, processing logic sets the test score initially to zero and the field is set to the first field, in this case F(1,1) (processing block 501). Thus, the field may be part of a grid of fields of any size, depending on the design of the test giver. In the test shown, the grid is unlimited in size and the field is represented as F(m, n), where m represents the difficulty of the question and n represents the number of the question asked. A test may be designed to ask a maximum of z questions, as shown in FIG. 5.

Next, processing logic presents a question (processing block 511). Each field contains a question. The question is presented to the student on a computer screen. Processing logic receives the student's response and it evaluates whether the response is correct. If the response is incorrect, processing logic determines whether the maximum number of questions have been asked by comparing n to z. If the maximum number of questions have been asked, processing logic proceeds to end the test and display the score as shown (processing block 540). If the test is not over, i.e. the maximum number of questions have not been asked, processing logic selects the next field (processing block 527), by adding 1 to n, and proceeds to processing block 511 to ask the next question. If the response to question 511 is correct as evaluated in processing block 522, processing logic adds the X(m, n) to the score (processing block 523). In one embodiment, the value of X(m, n) is set in advance by the test giver or test designer or other person responsible for the test and may vary with the type and difficulty of each question. After the value X(m, n) is added, processing logic determines whether the maximum number of questions has been asked (processing block 526). If so, the test is over, processing logic proceeds to end the test and display the score as described above (processing block 540). If the maximum number of questions hasn't been asked, (e.g., the test is not over), processing logic chooses the next field (processing block 525). In the test shown, the computer goes to the next level of difficulty by adding 1 to m and advances the test by adding 1 to n. Then, processing proceeds to processing block 511 to ask the next question in the new field.

In other embodiments, the test may proceed in other ways such as advancing the difficulty by adding 2 to m for correct answers and subtracting 1 from m for incorrect answers. Many different sequences will be obvious to those of ordinary skill in the art.

Using these same principles, a system of programmed learning may also be implemented. In a computer program, as described above, the computer may ask the student a question. Depending on how the question is answered, the computer may determine what type of information to present to the student. In this system, the answer to the questions would determine the next area that could be most beneficially covered, and increase, and maybe maximize, student learning and decrease, and maybe minimize, the time required.

Figure 6:
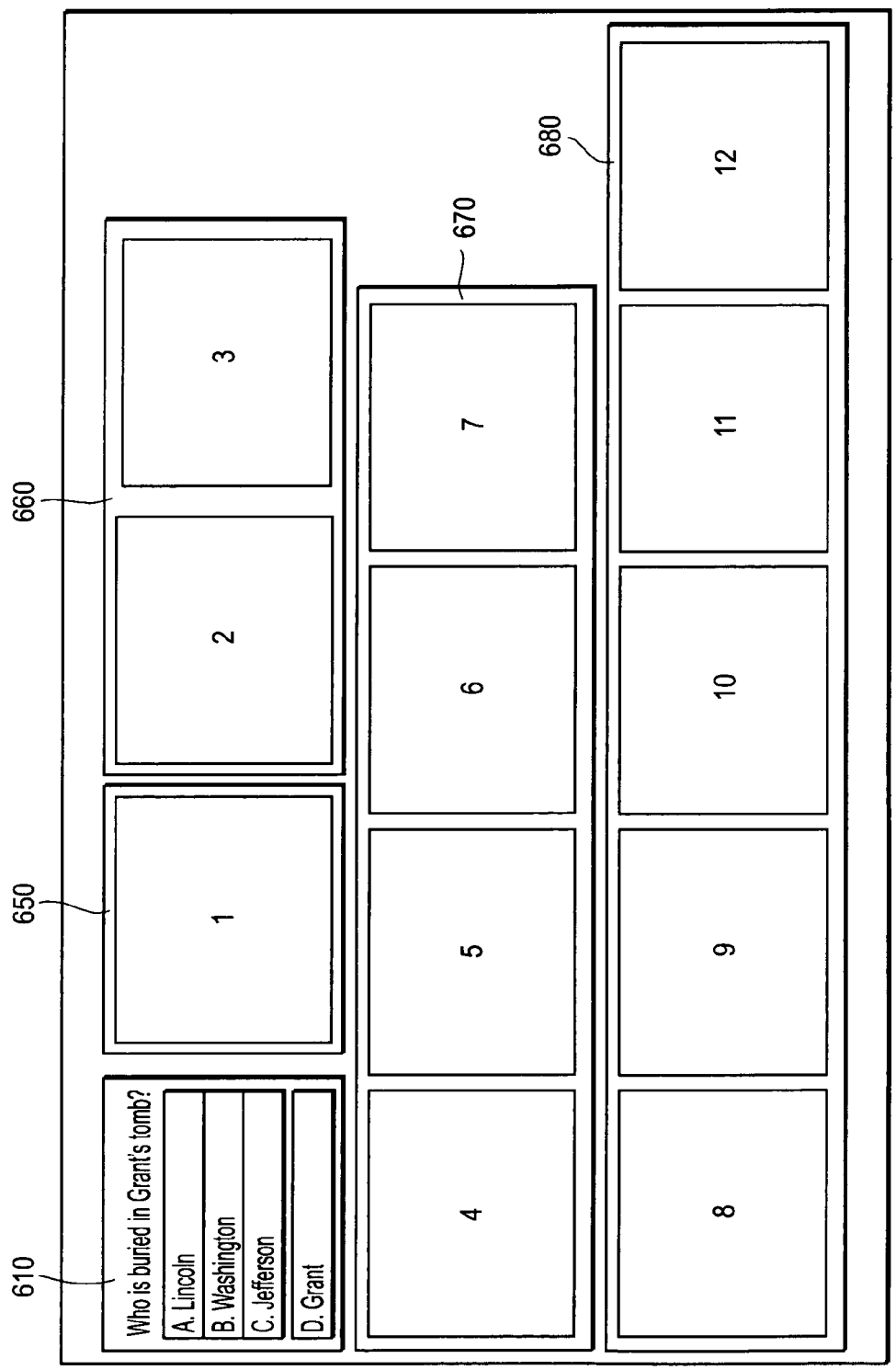
FIG. 6 illustrates one embodiment of an information gathering sheet.

With reference to FIG. 6, an information gathering sheet may contain five sections 610, 650, 660, 670 and 680. Section 610 may contain a question with four answer choices, as shown. If an individual selects answer D, which is the correct answer, then that individual may be referred to section 650 containing block 1. Removal of the removable concealer of block 1 may reveal general information about President Grant and then refer the individual to another page. Section 650, however, may ask the individual about which area he would like more information. If 650 asks what area the individual is interested in, the layout of section 650 resembles the question block 610 with the information under each of the answers referring the individual to a different page, depending on his choice of subject matter.

If the individual chooses A as the answer to the question in FIG. 6, he may be referred to section 660 containing blocks 2 and 3, which would give more information about Grant's tomb and Grant, for example. If the individual chooses B, the individual may be referred to section 670 containing blocks 4–7, which would give more detailed information. Finally, if the individual chooses C, the individual may be referred to section 680 containing blocks 8–12, which would provide even greater detail.

In the area of using a computer assisted mechanism such as the world wide web, a method of indicating approval or disapproval, indications of preference or information gathering is provided. This method of recording preferences or providing information eliminates the need to type, and thus introduce error, and is context sensitive. This method allows the preparation of a form which can branch from one field to the next dependent upon the choices made by the respondent. This allows much more information to be gathered of a more precise character. By reflecting the choices of the respondent the information thus gathered can be customized to a much greater extent and made more valuable to the gatherer.

Figure 7:
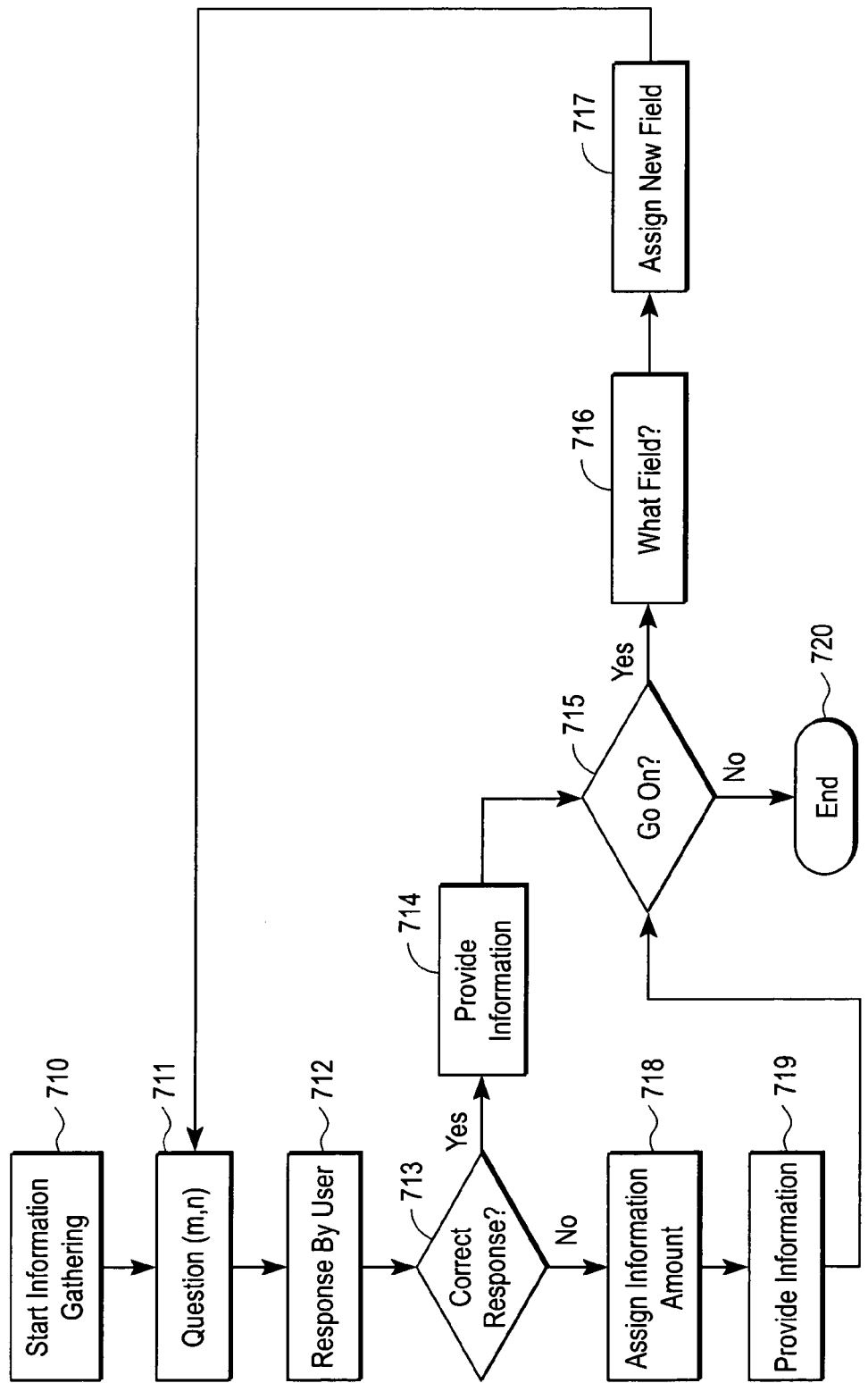
FIG. 7 illustrates one embodiment of a method of computer assisted information gathering.

FIG. 7 illustrates one method of using computer assisted mechanism to gather information. Referring to FIG. 7, an individual starts the information gathering in step 710. Processing logic presents the individual with a question in processing block 711 to which the individual responds in processing block 712. The processing logic evaluates whether the response is correct in processing block 713. If the response is correct, the processing logic provides the individual with additional information on the subject in processing block 714 and asks the individual whether he wants to continue in processing block 715. If the individual wants to continue, the processing logic asks the individual to choose a field in processing block 716 and assigns that field in processing block 717. Then, the processing logic starts the questioning process over again at processing block 711. If the individual does not want to continue, the information gathering session is ended at processing block 720.

If the response given by the individual in processing block 712 is incorrect, the processing logic will assign the amount of information to provide to the individual in processing block 718. The amount of information to provide will depend on the response selected by the individual, with the amount assigned to the response by the information provider or other person responsible for the system. In processing block 719, the information is provided to the individual. The individual is then asked if he wants to go on in processing block 715, as discussed above. Processing blocks 716 and 717 or 720 follow, as discussed above.

It will be appreciated that the response in processing block 712 may provide a preference or desire or other type of information that may not be classified as correct or incorrect. In that case, a field will be assigned based on the response chosen and processing blocks 713 and 714 will be skipped.

In the case of Tax Forms or other information gathering applications, certain responses could trigger the document to direct the applicant to additional forms that are required to complete the task. Thus, the form takes on the additional ability to instruct the respondent by using a context sensitive means. The ability to construct a form which reacts to the respondent's choices is an improvement in recording and processing information.

Figure 8:
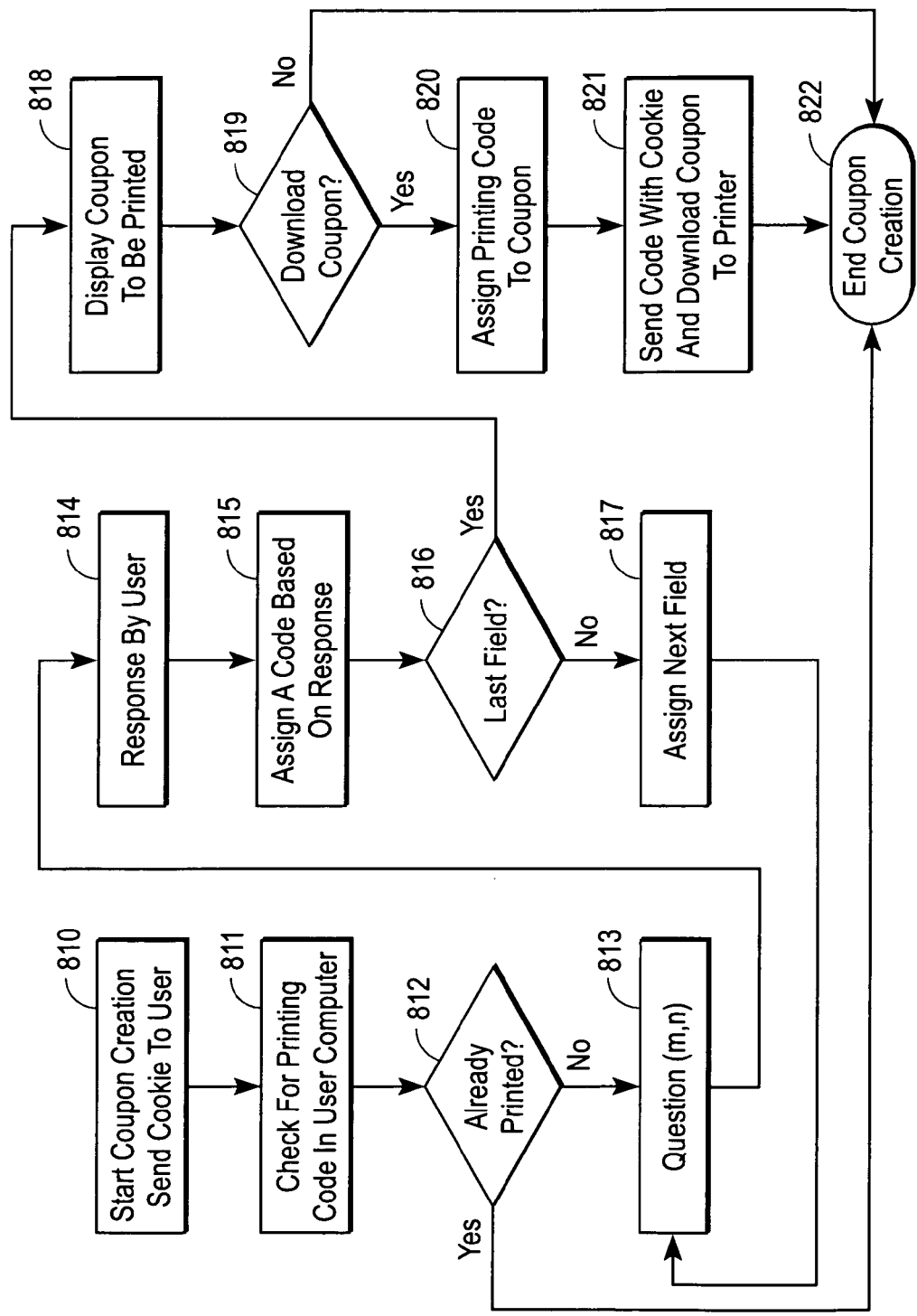
FIG. 8 illustrates one embodiment of a web-based self-targeting coupon.

FIG. 8 illustrates an embodiment of a method of providing self-targeting coupons over the internet. A website server may, based on a series of questions, provide an individual with a coupon that is targeted to the individual. As shown in processing block 810, the coupon creation process is started by sending a cookie to the user's web browser. The process of printing customized coupons may be limited to one coupon per computer by including a coupon with the download of the coupon data to a computer or printer. Thus, a website server may check for a printing code in the user's browser before allowing the user to proceed with the coupon creation, as shown in processing block 811.

If the website server finds that a coupon has already been printed or downloaded, as shown by processing block 812, the server may end the coupon creation process, as shown by processing block 822. If the website finds that a printing code does not exist in the user's browser, in processing block 812, the website will allow the coupon creation to continue.

In processing block 813, the website presents the individual with a question designed to discover the individual's preferences (similar to the coupons of FIGS. 1 and 2). After the individual responds in processing block 814, the website assigns a code to the coupon based on that response in processing block 815. Then, the website checks to see if a predetermined number of fields to determine an individual's preferences have been filled by the individual's responses in processing block 816. If there are more fields to fill, the next field is assigned in processing block 817 and processing returns to processing block 813 with the website continuing to ask the individual questions regarding the individual's preferences.

If the website server determines that all of the fields have been filled in processing block 816, the website server continues on to processing block 818, which displays on the individual's computer screen the coupon created. Then, the website server may ask the individual if the individual would like to print the coupon in processing block 819. If the individual does not want to print or download the coupon, the coupon creation session is ended in block 822. If the individual does want to print or download the coupon, a printing code is assigned to the coupon in processing block 820. Then, the cookie in the individual's browser is updated by the website browser to include the printing code while the coupon is downloaded to the computer or printer in processing block 821. Once the coupon is downloaded, the coupon creation process is ended in processing block 822.

Thus, a technique to print out a coupon which is customized to the individual's desire by controlling the printer via the computer is described. The individual goes to the web page and inputs his preferences, and the web page constructs a coupon reflective of his desires and downloads it to the individual's computer for print out. Web page security is shown to be used to allow only one time printing or downloads. Only the download would contain code which prevents multiple printing of the coupons and the computer cookie could identify the computer call up and prevent multiple downloads from the site.

Whereas many alterations and modifications of the present invention will no doubt become apparent to a person of ordinary skill in the art after having read the foregoing description, it is to be understood that the various embodiments shown and described by way of illustration are in no way intended to be considered limiting. Therefore, references to details of various embodiments are not intended to limit the scope of the claims which in themselves recite only those features regarded as essential to the invention.

I claim:

1. A method of scoring a coupon comprising:

scanning a coupon including a first field having at least one question and at least one answer on top of a removable concealer and a second field;

ensuring that a predetermined number of answers corresponding to the number of questions in the first field is selected in the first field by removal of the removable concealer;

ensuring that only a predetermined number of areas is selected by removal of removable concealer in the second field;

determining a score value of the coupon based on the predetermined number of areas selected in the second field having locations indicated by the predetermined number of answers selected in the first field; and presenting the score value to a user of the coupon, wherein a benefit of the coupon received by the user depends upon the score value, and wherein a type of the benefit is determined based on the predetermined number of areas selected in the second field and the predetermined number of answers selected in the first field.

2. The method of scoring a coupon of claim 1 further comprising:

ensuring that the area selected in the second field is indicated by the information revealed by the removal of the removable concealer in the first field.

3. The method of scoring a coupon of claim 1 further comprising:

ensuring that the area selected in the second field is NOT indicated by the information revealed by the removal of the removable concealer in the first field.

4. The method of scoring a coupon of claim 1 further comprising:

characterizing the coupon by information revealed by the removal of removable concealer in the second field, wherein the type of the benefit of the coupon is determined based on a result of characterizing the coupon.

5. The method of scoring a coupon of claim 4 wherein characterizing the coupon further comprises:

assigning a value to the coupon based on the score value which is determined based on information revealed by the removal of removable concealer in the second field.

6. The method of scoring a coupon of claim 4 wherein characterizing the coupon further comprises:

assigning a quantity to the coupon based on information revealed by the removal of removable concealer in the second field.

7. The method of scoring a coupon of claim 4 wherein characterizing the coupon further comprises:

assigning a free item to the coupon based on information revealed by the removal of removable concealer in the second field.

* * * * *